United States Patent [19]

Winsor

[11] 4,232,612
[45] Nov. 11, 1980

[54] WALL LINING WITH ATTACHMENT MEANS

[75] Inventor: Robert B. Winsor, Beaconsfield, Canada

[73] Assignee: IEC-Holden Ltd., Montreal, Canada

[21] Appl. No.: 880,126

[22] Filed: Feb. 22, 1978

[51] Int. Cl.³ ............................................ B61D 17/18
[52] U.S. Cl. ..................................... 105/423; 72/479; 52/798; 228/173 C; 228/165
[58] Field of Search .................. 105/423; 72/325, 479, 72/324, 347; 113/116 W, 116 F, 116 CC; 228/165, 170, 173 R, 173 C; 52/796-798

[56] References Cited

U.S. PATENT DOCUMENTS

| 993,127 | 5/1911 | Tinsley | 105/423 |
|---|---|---|---|
| 1,044,283 | 11/1912 | Stanger | 72/347 |
| 1,241,685 | 10/1917 | Van Dorn | 52/798 |
| 1,625,061 | 4/1927 | Trout | 52/798 |
| 2,300,449 | 11/1942 | Rowe | 105/423 |
| 2,900,926 | 8/1959 | Neuhart | 105/423 |
| 3,089,436 | 5/1963 | Buckley | 105/423 |
| 3,791,312 | 2/1974 | Snyder et al. | 105/423 |

Primary Examiner—Robert G. Sheridan
Assistant Examiner—Lawrence E. Williams
Attorney, Agent, or Firm—Guy J. Houle; Alan Swabey; Robert Mitchell

[57] ABSTRACT

A wall lining sheet, particularly, but not exclusively, for lining the interior end walls of freight railway cars. The wall lining sheet comprises a metal sheet having a plurality of spaced-apart attachment tabs each defined by a configured slot extending through the sheet. Each of the tabs has a bendable free end portion whereby the bendable free end portion may be displaced outwardly from the plane of the sheet. The wall lining is particularly useful in relining the interior surface of corrugated end walls of freight railway cars after the end wall has been deformed and reshaped substantially to its original state.

9 Claims, 10 Drawing Figures

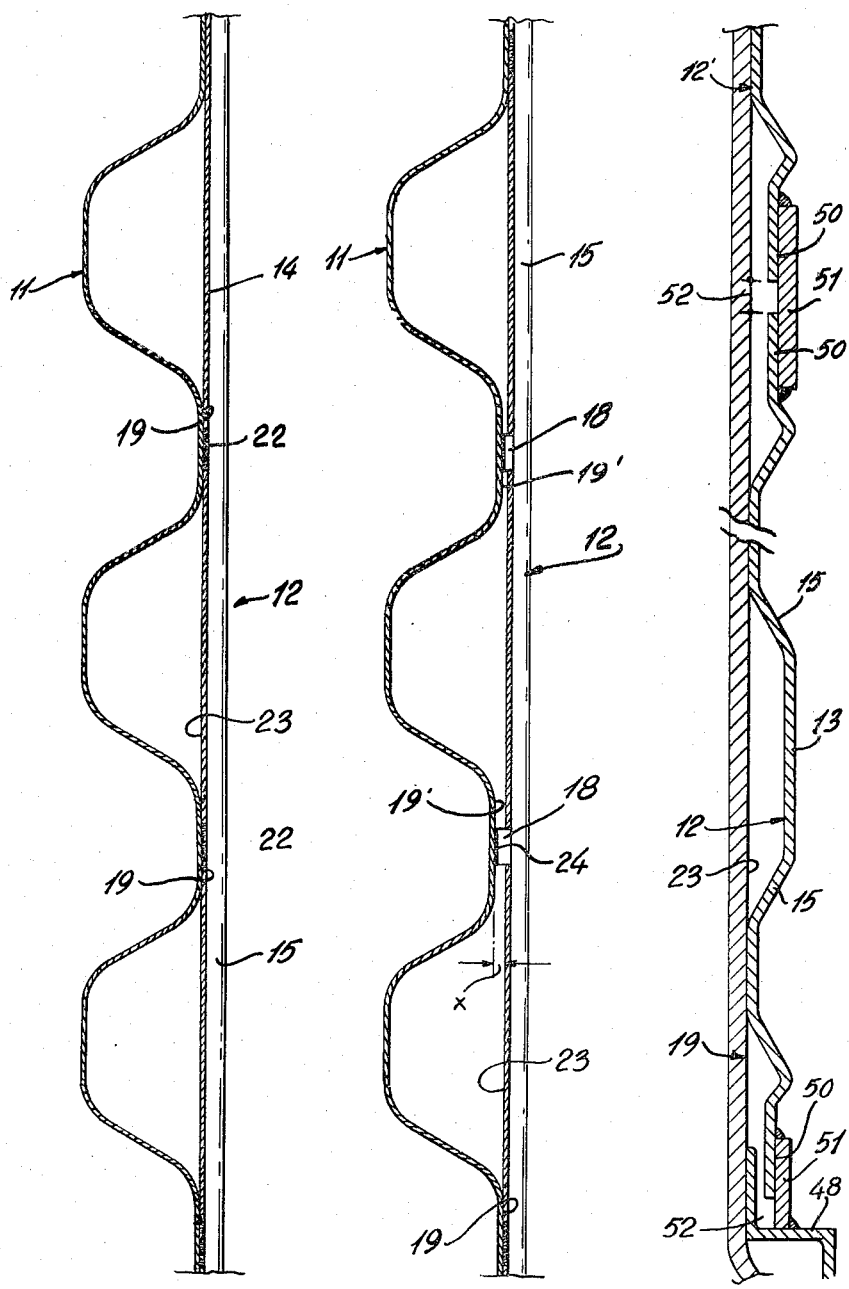

1

WALL LINING WITH ATTACHMENT MEANS

BACKGROUND OF INVENTION (a) Field of the Invention

The present invention relates to a wall lining sheet, particularly, but not exclusively, for use in relining the interior surface of a corrugated end wall of a freight railway car.

(b) Description of Prior Art

End walls of railway cars are often constructed of corrugated metal sheets which have interior linings, usually of wood, to provide a flat inside surface. The corrugated metal sheets provide most of the strength to the end wall structure, and are often subjected to high forces imposed by loads shifting against the end walls. Such load shifts are due to longitudinal impact forces between cars and can be violent. When end walls are damaged by such shifting interior loads or by other collisions, the inner wood lining often splinters and breaks and the outer corrugated metal sheet often deforms outwardly. When the end walls are damaged either due to shifting interior loads or outside collisions, it is difficult and time consuming to reline or repair the interior wall. First it is required to push back the corrugated end wall to substantially its normal state. The inner surface undulations of the end wall are never perfectly aligned in a common plane and when relining the interior wall voids occur between the lining and peak surface of some of the undulations in exterior wall. These voids weaken the rebuilt wall and complicate the construction of the lining.

SUMMARY OF INVENTION

It is a feature of the present invention to provide a wall lining sheet which substantially overcomes the above-mentioned disadvantages and which, when secured to an end wall of a freight railway car gives added strength to the end wall.

A further feature of the present invention is to provide a wall corrugated lining sheet having attachment means therein which will permit direct attachment of the sheet to an irregular backing surface at predetermined intervals along the lining.

A further feature of the present invention is to provide a wall lining sheet which is easy to install and requires very little time as compared to existing wall liners.

A further feature of the present invention is to provide a wall lining sheet for railway freight cars wherein the attachment means of the wall lining is recessed from the inner surface of the wall lining.

A further feature of the present invention is to provide a wall lining sheet which is constructed of a corrugated metal sheet in which the corrugations extend transversely to the corrugated end wall of a railway freight car when secured thereon whereby to provide added strength to the end wall and to distribute forces on the end wall when subjected to impact by internal loads in the railway freight car.

It is a further feature of the present invention to provide a wall lining sheet which does not require bridge framing for securement to the end wall of the railway freight car.

According to the above features, from a broad aspect, the present invention provides a wall lining sheet comprising a rigid sheet having a plurality of spaced-apart attachment tabs each defined by a configured slot extending through the sheet. Each of the tabs has a bendable free end portion whereby the bendable free end portion may be displaced outwardly from the plane of the sheet for securement of the sheet.

BRIEF DESCRIPTION OF DRAWINGS

A preferred embodiment of the present invention will now be described with reference to the accompanying drawings, in which:

FIG. 2C is a section view showing the wall lining secured to a ridge of a corrugated end wall;

FIG. 3C is a section view of a portion of an end wall showing the wall lining secured thereto with the tabs bent outwardly of the wall lining sheet to secure to respective ridges;

FIG. 6 is a cross-section view of an end wall with modified vertical end edges.

DESCRIPTION OF PREFERRED EMBODIMENTS

Figure 1:
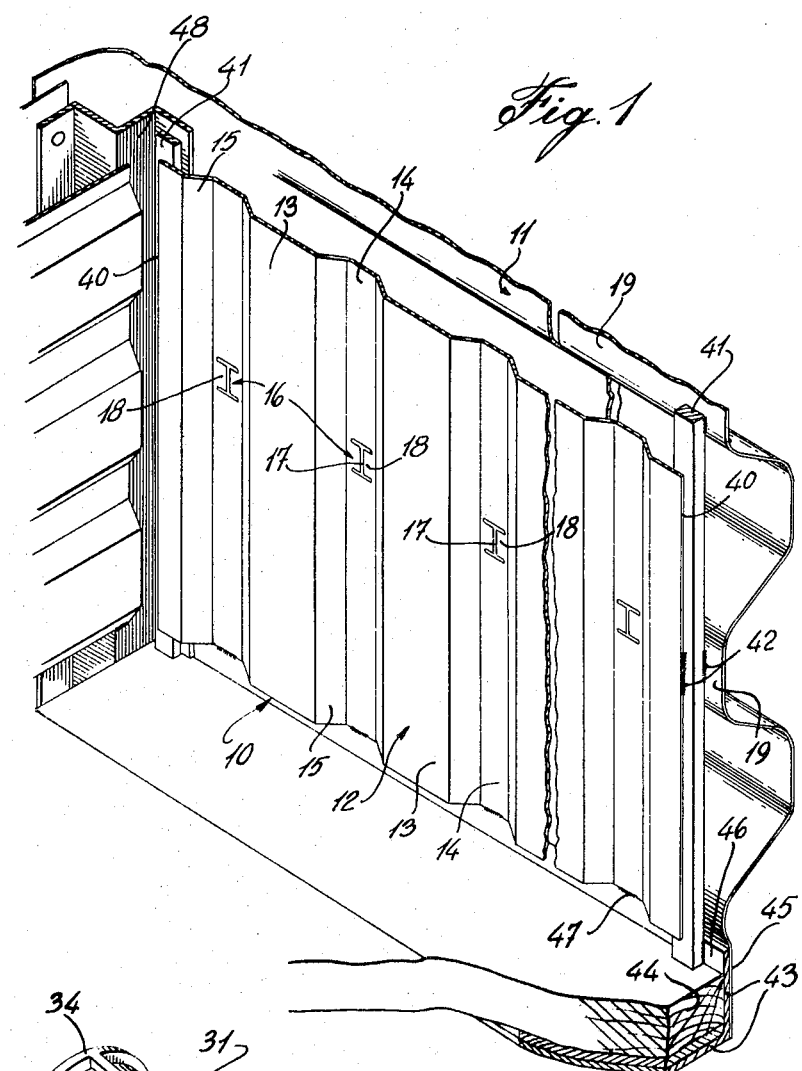
FIG. 1 is a fragmented perspective view showing the construction of an end wall of a railway freight car.

Referring now to the drawings and more particularly to FIG. 1, there is shown generally at 10, the construction of the wall lining sheet of the present invention as secured to a corrugated end wall 11 of a railway freight car. The wall lining sheet consists of a corrugated metal sheet 12 having alternating flat ridges 13 and channels 14 positioned between alternating ones of the ridges 13 in parallel relationship. A sloping wall 15 interconnects the side edges of the channels 14 to the ridges 13. The ridges 13, sloping wall 15 and channels 14 all have flat surfaces.

A plurality of spaced-apart attachment tabs 16 are provided in a spaced-apart manner along the channels 14 and in horizontal alignment with one another. These attachment tabs 16 are defined by a configured slot 17 extending through the sheet 12. The slot defines tabs 18 which have a bendable free end 20 (see FIG. 2A) which may be displaced outwardly of the plane of its respective channel wall for securing the sheet to the ridges 19 of the undulations on the corrugated end wall 11 and in a manner which will be described later.

Figure 2B:
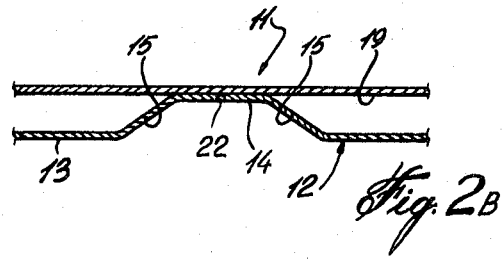
FIG. 2B is a section view along section line B—B of FIG. 2A.
Figure 2A:
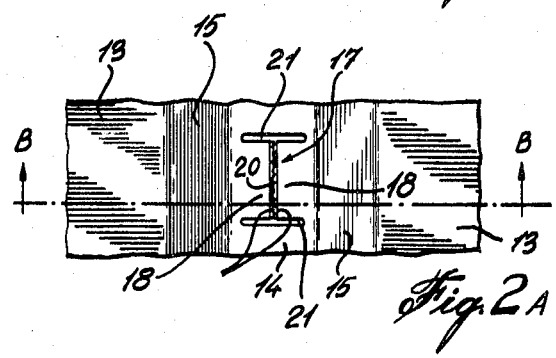
FIG. 2A is a fragmented front view of a portion of the lining sheet showing an attachment tab.

Referring now additionally to FIGS. 2A to 2C and 3A to 3C, it can be seen that the configured slot 17 defines a longitudinal central portion 20 extending substantially along the longitudinal axis of its respective channel 14 and substantially centrally thereon. The configured slot 17 also defines transverse end portions 21 formed integrally with the central portion 20 and extending transversely and substantially centrally at a respective end of the longitudinal portion 20 whereby the tabs 18 have opposed side edges. It is also conceived that the transverse end portions 21 may extend to one side only of the longitudinal portion 20 whereby to form a single bendable tab 18 rather than two opposed ones, as shown in FIG. 2A.

Figure 3B:
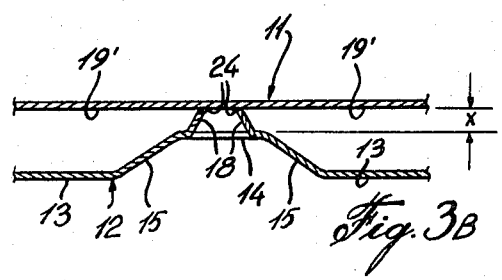
FIG. 3B is a section view along section lines B—B of FIG. 3A.
Figure 3A:
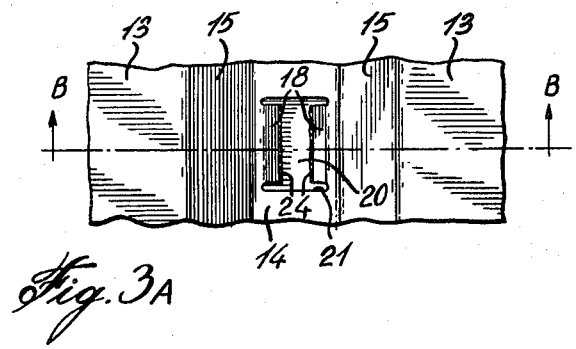
FIG. 3A is a fragmented front view of a portion of the lining sheet showing an attachment tab secured to a ridge of a corrugated end wall with the tabs bent outwards towards the ridge.

As shown in FIG. 2B, the wall lining sheet 12 is secured to a ridge 19 by forming a weld 22 between the peripheral edge of a free end 28 of the tabs 18 and the ridge 19 of the corrugated end wall 11. However, when the end wall 11 has been deformed and is reshaped substantially to its original configuration, the inner peripheries of the ridges 19 do not all line up in a common plane and are often offset from one another. Referring to FIGS. 3A to 3C, there is illustrated such deformation or offset. As hereinshown, a ridge 19' of the end wall 11 is deformed or recessed outwardly a distance "x" from the general plane of the end wall 11. When the corrugated metal sheet 12 is fitted, with the channels disposed transversely over the end wall 11, a gap "x" will exist between the outside face 23 of the channel 14 and the inside face of the ridge 19'. In order to provide a connection between the metal sheet 12 and the offset deformed ridge 19', the tabs 18 adjacent the deformed ridge 19' are bent outwardly until they touch the inner face of the ridge 19'. By bending the tabs 18 thusly, as illustrated in FIG. 3B, it can be seen that the central portion 20 of the slot will widen considerably providing access to a welding torch and rod therein to prevent the rod from bridging on metal parts and to form the proper welds 24 to secure the tabs 18 to the ridge 19'. Thus, it can be seen that the wall lining metal sheet 12 of the present invention can be secured to alternating ridges of a corrugated end wall of a railway freight car taking into account the tolerances normally provided when reshaping damaged end walls.

Figure 4:
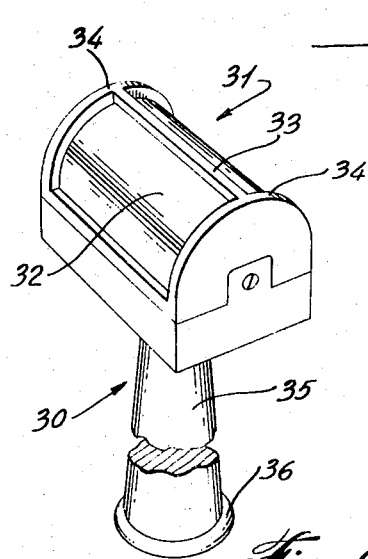
FIG. 4 is a perspective view of a tab deforming tool.
Figure 5:
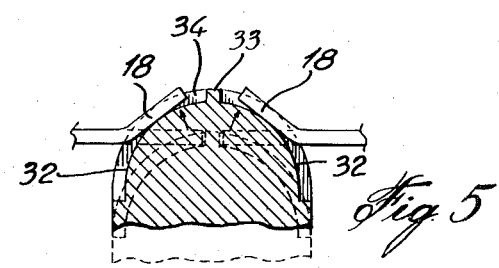
FIG. 5 is a top view of the tab deforming tool.

Referring now to FIGS. 4 and 5, there is shown generally at 30, a tab deforming tool which bends the tabs 18 outwardly of the surface of the channel wall. The tool 30 has a deforming head 31 having an arcuate top wall 32. An elongated rib 33 extends centrally across the long axis of the top wall 32 and is raised thereabove. Arcuate end ribs 34 extend transversely from a respective end of the elongated rib 33. The ribs 33 and 34 are dimensioned to be received in the central portion and at least the central part of the transverse end portions of the configured slot 17. A shaft 35 is secured to the deforming head 31 to permit the transfer of external force to the head 31 to effect the bending of the tabs 18. It is pointed out that other type punch tools may be used to deform the tabs 18.

In operation, the head 31 of the deforming tool 30 is lined up with its longitudinal central rib 33 fitted in the central portion 20 of the slot 17. By imparting blows to the free end 36 of the shaft 35, the tabs 18 will deform outwardly by the force transferred to them by the curved accurate top wall 32. This arcuate top wall 32 has a predetermined slope angle to compensate for the changes in the force required due to the angularity changes of the tab as they are being bent, whereby to facilitate the bending of these tabs. Also, the arcuate wall and the ribs make the head 31 self-centering whereby if one of a pair of opposed tabs 18 engages a top surface of a ridge 19 of an end wall before the opposed tab, the force applied to the head 31 will be transferred to the other tab preventing damaging of the tabs by the tool.

The wall lining 10 of the present invention is usually constituted by a corrugated sheet of a standard width and therefore a joint is often required along the vertical edges 40 of adjacent sheets when relining a wall. In a particular construction, when relining end walls 11, it is preferable to firstly secure metal studs 41 vertically over the corrugated end wall 11 and spaced to line up substantially centrally with the side edges 40 of the sheet 10. The sheet 10 is secured to the studs 41 by welds 42 made between the edge 40 of the sheet and the studs 41. The studs also provide lateral adjustment of adjoining sheets as the end walls normally reshaped or even in new construction, are not perfectly square. Accordingly, a small gap may result between opposed edges 40 of opposed lining sheets 10.

FIG. 1 illustrates a typical end wall construction wherein an angle iron 43 is provided along the bottom edge of the car and receiving floor planks 44 therein with the corrugated end wall secured thereto along the lower edge 45 thereof. The studs 41 are secured by welds along an upper portion 46 of the angle iron 43. Also, the bottom edge 47 of the channels 14 may be welded to this top portion 46.

Although FIG. 1 shows a construction with studs 41 extending vertically on the end wall 11, it is possible to secure a one piece wall lining 10 to the end wall 11. Thus, studs 41 may be required only in the corners of the end wall 11. Alternatively, the wall lining sheet 10 could be secured to the end wall 11 without the use of studs with the vertical edges of the sheet terminating along the width of the channels 14. Such a structure is illustrated in FIG. 6 wherein it can be seen that the vertical end edges 50 are formed in the end ridges 13 of the sheet 12. As hereinshown, the end edges 50 are offset inwardly from the plane of the ridges 13 (the front face of said sheet) to accommodate for the thickness of a closure strip 51 to be welded thereover to bridge opposed end edges 50 of adjacent sheets 12 and 12'. A closure strip 51' also connects the end edge 50 to the corner bracket 48 of the railway car. The gap 52 resulting at the outward edge of the end edges 50 permits lateral adjustment of the sheets 12 and this gap 52 is concealed behind the strip 51. Thus, with this arrangement, it is not necessary to install studs 41. Any deformation of the end wall 11 is compensated by the attachment tabs 16 and the sheets 12 remain uniform throughout.

It is also seen that the corrugated wall lining provides an attachment weld to be made in an area which is recessed from the innermost surface of the wall lining, herein the innner surface of the ridges 13. Therefore, there is no requirement to have the welds ground as they will not be in contact with commodity located within the railway freight car and therefore cannot damage commodity. Also, the fact that the inner wall is corrugated and is connected to an end wall also corrugated and disposed at right angles thereto, provides for a very rigid end wall, which is desirable in railway freight cars as it is often subject to collisions and internal damage. Also, this transverse arrangement of the corrugation provides a better distribution of impact forces on the end wall by load shifting. Further, the present invention allows welded connection of the wall lining to the corrugated end wall at all intended connection points without the use of bridge framing or separate filler pieces that would otherwise be required to effect the continuous repeating connection pattern that is necessary to build a composite wall of uniform strength. Still further, the refitting of an end wall using the corrugated wall lining sheet of the present invention may be done faster and is less expensive and does not require any elaborate fixtures.

It is within the ambit of the present invention to provide any obvious modifications of the preferred embodiment described hereinabove, provided such modifications fall within the ambit of the appended claims.

I claim:

1. A wall lining sheet comprising a rigid sheet having a plurality of spaced-apart bendable attachment tabs disposed in the plane of said sheet and each defined by a configured slot extending through said sheet, said sheet being free of support adjacent said tabs and each said tabs having a bendable free end portion and transverse opposed side edges free of said sheet whereby said bendable free end portion may be displaced outwardly from the plane of said sheet without deforming said sheet for securement of said sheet to a backing structure having an irregular outer plane, said securement being effected by a weld formed between said tabs and said outer plane through an opening formed by said configured slot after deformation of said tabs to an adjacent portion of said irregular plane.

2. A sheet as claimed in claim 1 wherein said sheet is a corrugated metal sheet having alternating ridges and channels extending parallel to one another across said sheet.

3. A sheet as claimed in claim 2 wherein said attachment tabs are located at predetermined intervals along at least some of said channels, said configured slot having a longitudinal central portion extending on the long axis of an associated channel to define said free end portion and transverse side portions formed with said central portion to define said opposed side edges and each extending on a common side of said longitudinal central portion to define said attachment tab therebetween.

4. A sheet as claimed in claim 3 wherein said transverse side portions each extend on opposed sides of said central portion with said central portion located substantially mid-way of each transverse end portions, said configured slot defining opposed attachment tabs.

5. A sheet as claimed in claim 4 wherein said configured slot central portion is progressively wider as said tabs are bent to a common side of said sheet to provide a progressively larger opening in said sheet for access to said tabs for welding said tabs to said backing structure.

6. A sheet as claimed in claim 4 in combination with a corrugated wall panel, said channels of said sheet extending transverse to corrugations of said corrugated wall panel with said attachment tabs aligned with respective ridges of said corrugations of said corrugated wall panel.

7. A sheet as claimed in claim 6 wherein said corrugated wall panel has an irregular planar inner surface with some of said ridges lying in different planes, at least some of said tabs being bent outwardly to contact a respective ridge of said corrugated wall panel and secured thereto by welds.

8. A sheet as claimed in claim 2 wherein said sheet is provided with vertical end edges formed along said ridges and offset inwardly of a front face of said sheet to accommodate a closure strip to be secured thereto without protruding above said front face.

9. In a railway car comprising corrugated end walls each having an outer face with elevated ridges, the improvement comprising a wall lining sheet secured over an inner face of each said end walls, said wall lining sheet comprising at least one metal sheet having a plurality of spaced-apart bendable attachment tabs disposed in the plane of said sheet and each defined by a configured slot extending through said sheet, each said tabs having a bendable free end portion and transverse opposed side edges free of said sheet whereby each said tabs is displaceable from its normal plane without deforming the sheet, at least some of said tabs being welded to said elevated ridges of said outer face of said end walls with at least some of said tabs bent outwardly of said sheet towards said inner face to compensate for irregular spacing between said outer face of said wall lining and said elevated ridges of said inner face of said corrugated end walls, said weld being formed between said tabs and said elevated ridges through an opening formed by said configured slot after deformation of said tabs to an adjacent portion of said elevated ridges.

* * * * *